United States Patent
Schmidt et al.

(10) Patent No.: US 8,275,430 B2
(45) Date of Patent: Sep. 25, 2012

(54) ARRANGEMENT WITH A SUPERCONDUCTIVE CABLE

(75) Inventors: Frank Schmidt, Langenhagen (DE); Nicolas Lallouet, Siennes (FR)

(73) Assignee: Nexans, Paris (FR)

( * ) Notice: Subject to any disclaimer, the term of this patent is extended or adjusted under 35 U.S.C. 154(b) by 28 days.

(21) Appl. No.: 13/028,356

(22) Filed: Feb. 16, 2011

(65) Prior Publication Data

US 2011/0269630 A1   Nov. 3, 2011

(30) Foreign Application Priority Data

Apr. 28, 2010   (EP) .................................... 10305443

(51) Int. Cl.
*H01L 39/24* (2006.01)
(52) U.S. Cl. .................................... 505/230; 174/125.1
(58) Field of Classification Search ................ 505/220, 505/230; 174/125.1, 75 R
See application file for complete search history.

(56) References Cited

U.S. PATENT DOCUMENTS 6,049,036 A * 4/2000 Metra ........................... 174/15.5
7,825,331 B2 * 11/2010 Allais et al. ................... 174/15.4
2007/0137881 A1 * 6/2007 Ashibe ........................ 174/125.1
2007/0181324 A1 * 8/2007 Allais et al. ................... 174/15.4

FOREIGN PATENT DOCUMENTS

DE   202004007187 U1   9/2004

* cited by examiner

*Primary Examiner* — Colleen Dunn
(74) *Attorney, Agent, or Firm* — Sofer & Haroun, LLP

(57) ABSTRACT

An arrangement for an electrically conducting connection of a superconductive electric cable with a cable having normal conductivity at room temperature is provided, which includes a passage with an electric conductor surrounded by a thermal insulation. The conductor of the superconductive cable is connected to an end of the conductor of the passage, at whose other end a cable having normal conductivity can be connected. On the end of the superconductive cable intended to connect to the conductor of the passage an electrode is mounted serving the electric field control. At least in the area of the electrode a cryostat is present which surrounds it, which is constructed as a circumferentially closed sheath of electrically insulating material with a vacuum free, thermal insulation. The end of the sheath facing the passage is placed during the state of operation of the arrangement at high voltage potential, while the other end is connected to ground potential.

3 Claims, 1 Drawing Sheet

ARRANGEMENT WITH A SUPERCONDUCTIVE CABLE

RELATED APPLICATION

This application claims the benefit of priority from European Patent Application No. 10 305 443.3, filed on Apr. 28, 2010, the entirety of which is incorporated herein by reference.

BACKGOUND

1. Field of the Invention

The invention relates to an arrangement for the electrically conductive connection of a superconductive electric cable to a normally conductive electrical cable at room temperature.

Such an arrangement is disclosed in EP 1 811 626 A1.

2. Description of Related Art

Such an arrangement is required, for example, for connecting a superconductive electrical cable to an electric current distribution network. Superconductive cables have in today's technology electric conductors of a conductive material which contains ceramic material, which at sufficiently tow temperatures changes over into the superconductive state. The electrical direct current resistance of an appropriately constructed conductor is zero with sufficient cooling as long as a certain current is not exceeded. Suitable ceramic materials are, for example, BSCCO (Bismuth-strontium-calcium-copper-oxide) as materials of the first generation or ReBCO (Rare-earth-barium-copper-oxide), particularly YBCO (Yttrium-barium-copper-oxide), as materials of the second generation. Sufficiently low temperatures for placing such materials into the superconducting state are, for example, between 67 K and 90 K. Suitable cooling agents are, for example, nitrogen, helium, neon and hydrogen or mixtures of these materials. For example, for connecting a superconductive cable to a normally conductive cable, for example, electrical passages with an electrical conductors surrounded with an electrically effective insulation are utilized. Connected to the conductor of the passage is in an operatively ready arrangement, on the one hand, the conductor of, for example, the superconductive cable cooled to a temperature of 70 K and, on the other hand, a cable of a current distribution network which is operated at an ambient temperature of about 20 degrees C.

DE 20 2004 007 187 U1 discloses a testing end closure for a superconductive cable. On the end of the superconductive cable is mounted an electrode serving the field control. This end of the superconductive cable is surrounded by a sheath constructed as a pipe piece which is closed at one of its ends by a cover, A passage extends through the cover for the current supply of the conductor of the superconductive cable. The pipe piece of the sheath as well as the cover are constructed with double walls. Between the two walls of sheath and cover are present either a vacuum or an excess nitrogen pressure.

The above-mentioned EP 1 811 626 A1 describes an arrangement with a housing composed of three parts. The parts of the housing are arranged next to each other or one above the other. In the middle portion of the housing is provided a passage which has an insulated electrical conductor. On the insulation of the conductor is arranged a field control layer which is composed, for example, of a layer of zinc adhering to the outer surface of the field control layer. The surface is connected to a field control cone well known in high voltage technology and surrounds the conductor. The conductor of the device equipped in this manner is embedded in an insulating body which is composed of an electrically insulating material. At one end of the passage, the conductor thereof extends out of the insulating body to a connection of the cable of the current supply network, while its other end serves for connecting the superconductive cable which is surrounded by a cryostat composed of metal pipes equipped with a vacuum insulation. Between the conductor of the passage and the electrically effective insulating body is provided an intermediate layer which facilitates sliding of the conductor in the insulation body.

3. Objects and Summary

The invention is based on the object of simplifying the arrangement described above.

The sheath of the cryostat can have any selected useful geometric shape. In accordance with a preferred embodiment, the sheath is constructed as a pipe piece with a preferably cylindrical cross section. In the following, instead of the term "circumferentially closed sheath", the word "pipe piece" is used for simplicity's sake.

In this arrangement, the end of the superconductive cable equipped with an electrode serving for electrical field control is surrounded by a pipe piece of a cryostat which is composed of an electrically effective insulating material provided with a vacuum-free thermal insulation and is provided at its outer surface with a layer of vacuum-free thermally insulating material. Consequently, a complicated vacuum insulation present in other cryostats is not required. Rather, in particular for the thermal insulation of the pipe piece, known materials with thermally insulating properties can be used, In the described configuration of the arrangement, the transition of the conductor of the superconductive cable to ambient temperature can be configured without any additional insulation, because the range of this transition in the state of operation of the arrangement is at the high voltage potential. Therefore, the electrical conductor of the passage does only have to be surrounded by an insulating body serving for thermal insulation. As a whole, the arrangement can be constructed compact and simple, even for high voltages. The electrode attached to the superconductive cable serving for the electrical field control can simultaneously be used for the field control for the entire arrangement.

When using the arrangement for superconductive direct current cables, there are additionally no thermal problems or space loading problems in solid insulation materials, as is the case in conventional high voltage direct current cables with solid insulating materials.

The term "high voltage" is intended to include electrical voltages which are above 1 kV. In the present case, voltages in the range of 200 kV are utilized.

The arrangement is used in a preferred embodiment in a vertical construction. In order to avoid a thermal formation of layers in the pipe piece in such a position of superconductive cables, the cooling agent is advantageously introduced at the uppermost point into the pipe piece. This can be achieved, for example, by a pipe of insulating material which conveys the cooling agent within the pipe piece to high voltage potential.

BRIEF DESCRIPTION OF THE DRAWINGS

An embodiment of the subject matter of the invention is illustrated in the drawing.

In the drawing.

DETAILED DESCRIPTION

Figure 1:
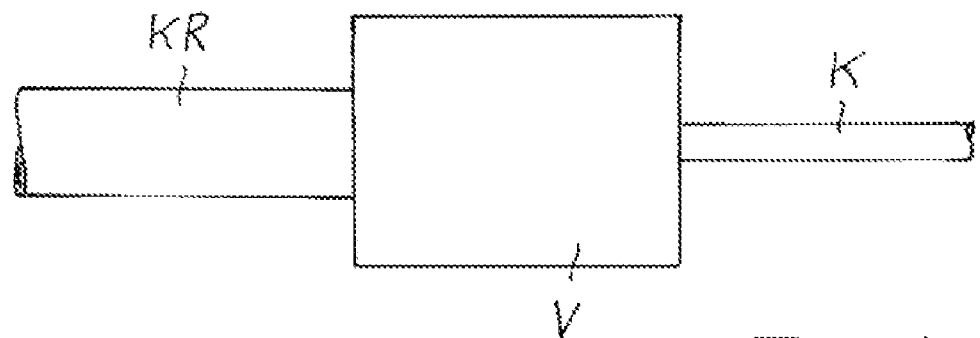
FIG. 1 is a schematic illustration of the end of the transfer section with a superconductive cable.
Figure 2:
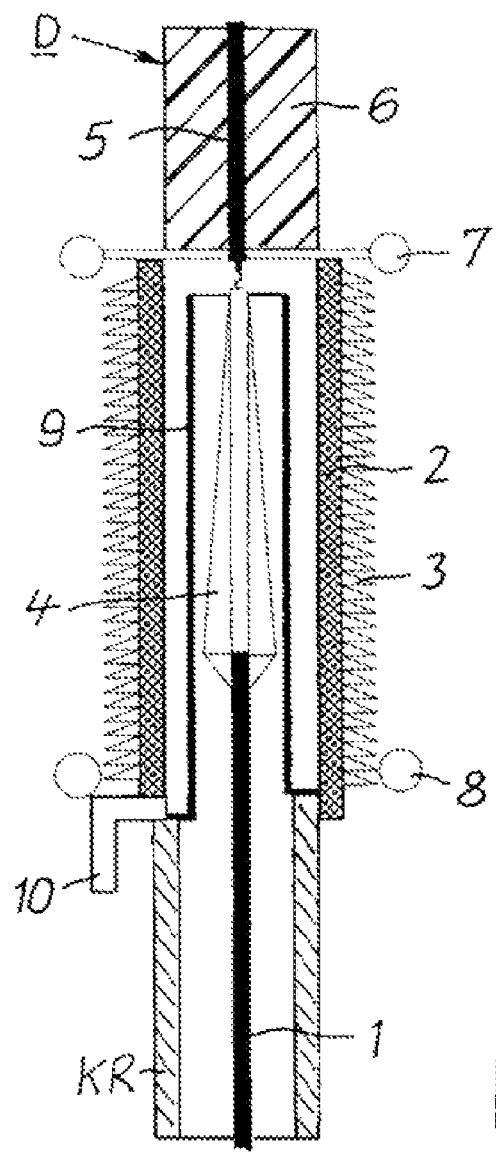
FIG. 2 is an illustration of the arrangement according to the invention on a larger scale.

In FIG. 1, a rectangle represents an end closure V of a transmission section equipped with a superconductive electric cable for electric current. Connected to the end closure V is a cryostat KR on the hand, in which a superconductive cable I illustrated in FIG. 2 is contained. On the other hand, an electric cable K with normal conductivity is connected to the end closure V which belongs to a current supply network. For the connection between the superconductive cable 1 and the cable K having normal conductivity, an arrangement contained in the end closure V is used, as it is illustrated, for example, in FIG. 2.

The arrangement according to FIG. 2 is used at the end of the cryostat KR. It can basically be carried out in horizontal position. In a preferred embodiment, the arrangement is however—as mentioned before—arranged in a vertical direction. This vertical configuration is illustrated in FIG. 2. It will be described in the following also representing a horizontal configuration.

In accordance with FIG. 2, the arrangement includes a sheath constructed as a pipe piece 2 which is composed of an electrically insulating material and is insulated thermally so as to be vacuum-free. The pipe piece 2 of the sheath, in the following merely called "pipe piece 2", is composed, for example, of glass fiber-reinforced synthetic material. For its thermal insulation, the pipe piece 2 is provided on its outer surface with a layer 3 of vacuum-free thermally insulating material, indicated by zigzag lines, for example, with formed polyurethane. The pipe piece 2 is connected at its lower end, by means of a flange connection to the cryostat KR of the transmission section.

The superconductive cable 1 is arranged in the cryostat KR in such a way that it protrudes into the pipe piece 2. Its end is surrounded by an electrode 4 which serves for the electrical field control. The field control can be constructed as a capacitive field control also as an arrangement wound of conductive inserts. The conductor of the cable 1 is connected to an electric conductor 5 of a passage D, wherein the passage D is surrounded by an insulating body 6 which exclusively serves for the thermal insulation. At its other end, the conductor 5 can be connected to the cable K of the current supply network.

The end of the pipe piece 2 facing the passage D is also connected with a flange. The high voltage is placed at this end of the pipe piece 2. This is indicated by the screening rings 7 shown in FIG. 2. Accordingly, the transfer area between pipe piece 2 and passage is located in the case of operation high voltage potential. At the end of the pipe piece 2 facing away from the passage D, screening rings 8 placed on ground potential are placed.

The cooling agent is advantageously supplied to the pipe piece 2 at its uppermost point for avoiding thermal layering and the formation of gas bubbles; in other words, the supply takes place in the high voltage area. This can be carried out essentially in any chosen manner. However, in a preferred embodiment, a pipe 9 consisting of insulation material 7 is illustrated for cooling agent supply in the pipe piece 2. The pipe 7 extends up to the area of the upper end of the pipe piece 2 and the cooling agent is added through an intake 10.

The invention claimed is:

1. Arrangement for an electrically conducting connection of a superconductive electric cable with a cable having normal conductivity at room temperature, where the cable includes a passage with an electric conductor which is surrounded by thermal insulation, in which the superconductive cable is arranged in a tubular cryostat for guiding a cooling agent, and where the conductor of the superconductive cable is connected to an end of the conductor of the passage, and whose other end is connectable to the cable having normal conductivity, wherein:
   on the end of the superconductive cable intended in connection to the conductor of the passage is mounted in the manner known per se an electrode serving for the electric field control;
   that the end of the cable is surrounded by a circumferentially closed sheath constructed as a pipe piece of electrically insulating material with a vacuum-free thermal insulation which is provided on its outer surface with a layer of vacuum-free thermally insulating material; and
   that the end of the sleeve facing the passage is placed during the state of operation of the arrangement at high voltage potential, while the other end is connected to ground potential.

2. Arrangement according to claim 1, wherein the supply point for the supply of the cooling agent is arranged in the cryostat at the end of the sleeve facing the passage.

3. Arrangement according to claim 2, wherein for supplying the cooling agent inside the sheath of the cryostat, a pipe including insulating material is arranged.

* * * * *